United States Patent
Shirota

(10) Patent No.: US 7,353,356 B2
(45) Date of Patent: Apr. 1, 2008

(54) HIGH SPEED, LOW CURRENT CONSUMPTION FIFO CIRCUIT

(75) Inventor: Hiroshi Shirota, Tokyo (JP)

(73) Assignee: Renesas Technology Corp., Chiyoda-Ku, Tokyo (JP)

(*) Notice: Subject to any disclaimer, the term of this patent is extended or adjusted under 35 U.S.C. 154(b) by 63 days.

(21) Appl. No.: 10/222,915

(22) Filed: Aug. 19, 2002

(65) Prior Publication Data

US 2003/0172241 A1    Sep. 11, 2003

(30) Foreign Application Priority Data

Mar. 7, 2002    (JP)    ............... 2002-062486

(51) Int. Cl.
*G11C 8/04*    (2006.01)
(52) U.S. Cl. .................... 711/167; 365/239
(58) Field of Classification Search ............... 711/167, 711/219; 710/3, 57, 58, 61, 118, 310; 377/37, 377/43, 46, 54, 76; 365/189.01–189.03, 365/220, 221, 236
See application file for complete search history.

(56) References Cited

U.S. PATENT DOCUMENTS 6,366,529 B1* 4/2002 Williams et al. ............ 365/239
2002/0084807 A1* 7/2002 Miyamoto et al. .......... 326/130

FOREIGN PATENT DOCUMENTS

| JP | 1-258290 | 10/1989 |
|---|---|---|
| JP | 10-50052 | 2/1998 |
| JP | 11-120757 | 4/1999 |
| JP | 2000-259391 | 9/2000 |
| JP | 2001-285346 | 10/2001 |

OTHER PUBLICATIONS

National Semiconductor Corporation, "Low Power 4-Stage Counter/Shift Register", PN 100336, Aug. 1998. www.National. com.*
Yoshitaka Toriumi et al., "15. FIFO (synchronous bus): Chapter 2, Practical Sample Description of VHDL/Verilog-HDL of special issue, Don't Fear HDL anymore!", Design Wave Magazine, pp. 57-59, Jan. 2000, CQ Publishing Co., Ltd., Tokyo, Japan.

* cited by examiner

*Primary Examiner*—Donald Sparks
*Assistant Examiner*—Jesse Diller
(74) *Attorney, Agent, or Firm*—Buchanan Ingersoll & Rooney PC

(57) ABSTRACT

A FIFO circuit includes a write counter circuit, a memory circuit, a read counter circuit and a selector circuit. The write counter circuit counts a write clock signal during a valid period of input data, and outputs a write counter value. The memory circuit stores the input data in response to the write counter value. The read counter circuit counts a read clock signal when a decision is made that the memory circuit includes data that has not yet been read out, and outputs a read counter value. The read selector circuit reads data from the memory circuit in response to the read counter value. A small scale FIFO circuit can be obtained.

5 Claims, 11 Drawing Sheets

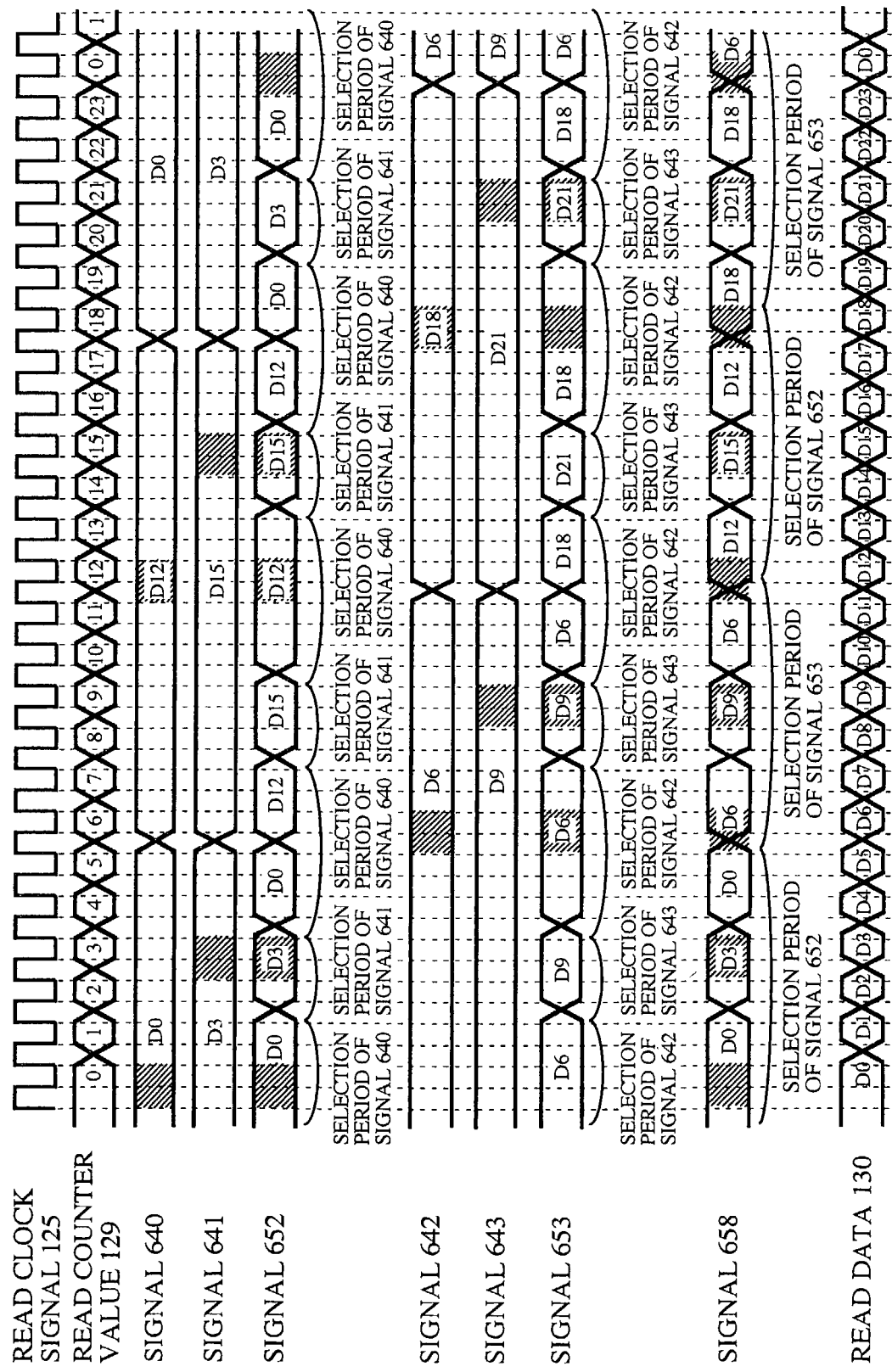

HIGH SPEED, LOW CURRENT CONSUMPTION FIFO CIRCUIT

BACKGROUND OF THE INVENTION

1. Field of the Invention

The present invention relates to a low current consumption FIFO (First In First Out) circuit capable of implementing a FIFO function of high-speed data.

A high-speed serial transmission system according to USB 2.0 High Speed Standard (transmission rate: 480 Mb/s) or the like allows a certain error between the transmission rate of external data and the frequency rate of an internal clock signal (±500 ppm for USB 2.0). To absorb the frequency error between the two rates, a FIFO circuit is generally used. The present invention relates to the FIFO circuit that handles such high-speed data, which is simple in structure with low current consumption and high operation speed. Although the following embodiments in accordance with the present invention are explained by way of example of the USB 2.0 High Speed Standard, the application field of the FIFO circuit in accordance with present invention is not limited to the USB 2.0 standard.

2. Description of Related Art

A FIFO circuit is one of memory circuits generally used for exchanging data with different frequencies. It writes data synchronized with a clock signal A, and reads data in the same sequence as the write sequence using a clock signal B different from the clock signal A.

The following document describes a conventional example of the FIFO circuit.

Yoshitaka Toriumi, Masaharu Taharazako, and Kenji Yokomizo, "15. FIFO (synchronous bus): Chapter 2, Practical Sample Description of VHDL/Verilog-HDL of special issue, Don't Fear HDL anymore!", Design Wave Magazine, pp. 57-59, January, 2000.

The conventional FIFO circuit has a complicated logic for detecting the full or empty state of the FIFO to prevent its underrunning and overrunning, thereby bringing about an increase in the scale and a decrease in the speed of the circuit.

In addition, it is difficult for the conventional FIFO circuit to increase its speed because the memory access causes a bottleneck by applying an SRAM or the like which is accessed by addresses to its memory array. On the other hand, constructing the memory array by registers like a flip-flop circuit will increase the current consumption, thereby presenting a problem of making it difficult to implement a low current consumption FIFO circuit.

SUMMARY OF THE INVENTION

The present invention is implemented to solve the foregoing problem. It is therefore an object of the present invention to provide a small scale, high speed, low current consumption FIFO circuit.

According to one aspect of the present invention, there is provided a FIFO circuit comprising: a write counter circuit for counting a write clock signal during a valid period of input data, and for outputting a write counter value; a memory circuit for storing the input data in response to the write counter value; an empty address management circuit for deciding as to whether the memory circuit includes data which has not yet been read out of the memory circuit, in response to the write counter value and a read counter value; a read counter circuit for counting a read clock signal and for outputting the read counter value when the empty address management circuit makes a decision that the memory circuit includes the data which has not yet been read; and a selector circuit for selecting and reading data from the memory circuit in response to the read counter value. Thus, the FIFO circuit writes data to and reads data from the memory circuit in accordance with the counter value of the write counter circuit and that of the read counter circuit. As a result, it offers an advantage of being able to simplify the circuit configuration.

BRIEF DESCRIPTION OF THE DRAWINGS

FIG. 12 is a timing chart illustrating the operation of the selector circuit of the embodiment 7 in accordance with the present invention.

DETAILED DESCRIPTION OF THE PREFERRED EMBODIMENTS

The invention will now be described with reference to the accompanying drawings.

Embodiment 1

Figure 1:
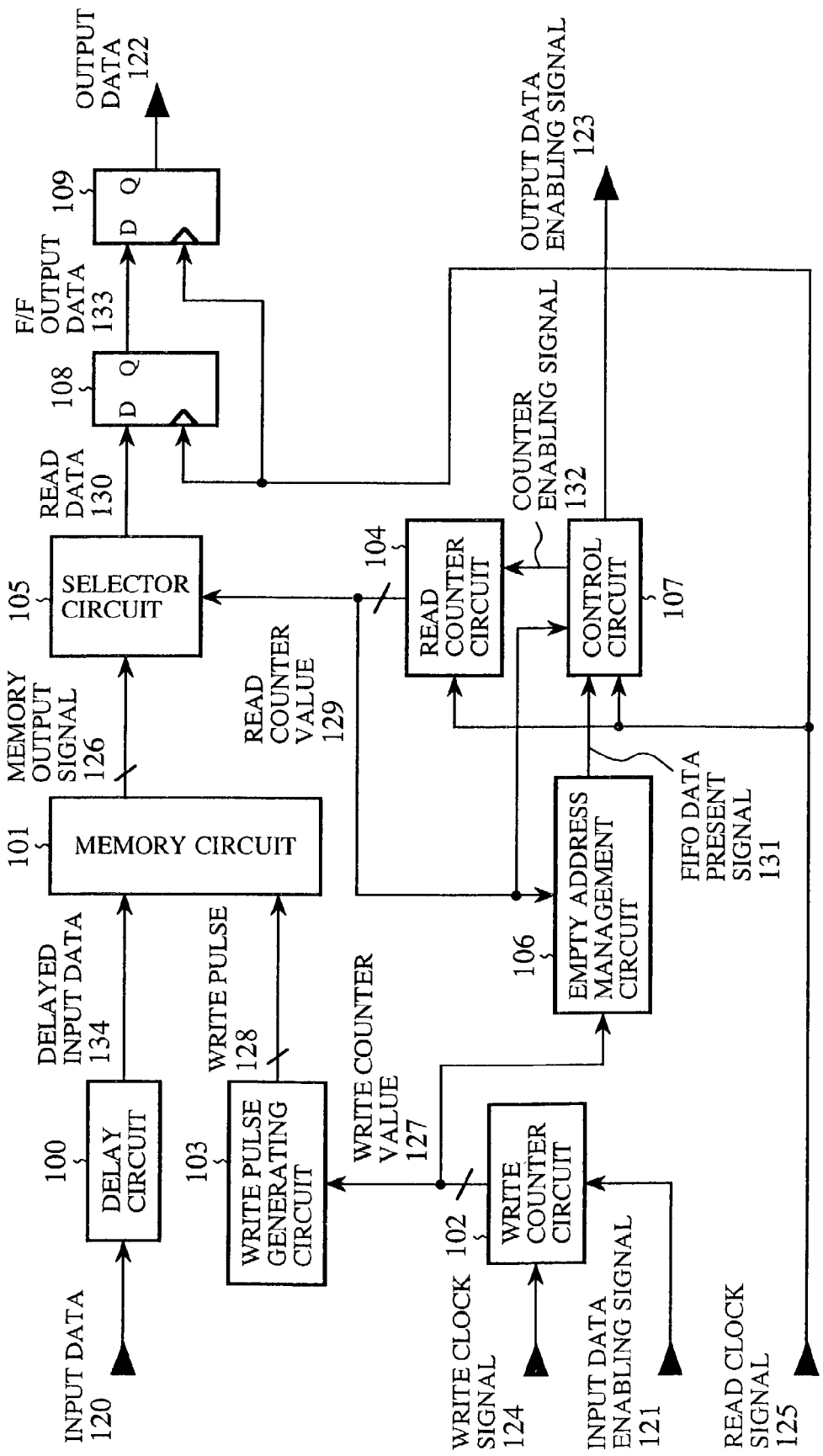
FIG. 1 is a block diagram showing a FIFO circuit of an embodiment 1 in accordance with the present invention.

FIG. 1 is a block diagram showing a FIFO circuit of an embodiment 1 in accordance with the present invention. In this figure, the reference numeral 100 designates a delay circuit for delaying input data 120 to produce delayed input data 134 synchronized with write pulses 128; and 101 designates a memory circuit for storing the delayed input data 134 in response to the write pulses 128.

The reference numeral 102 designates a write counter circuit for counting a write clock signal 124 in response to an input data enabling signal 121, and for outputting a write counter value 127; and 103 designates a write pulse generating circuit for converting the write counter value 127 to the write pulses 128.

The reference numeral 104 designates a read counter circuit for counting a read clock signal 125 in response to a counter enabling signal 132, and outputting a read counter value 129; 105 designates a selector circuit for selecting a memory output signal 126 fed from the memory circuit 101 in response to the read counter value 129, and for outputting read data 130; 106 designates an empty address management circuit for outputting a FIFO data present signal 131 in response to the write counter value 127 and read counter value 129; and 107 designates a control circuit for converting the FIFO data present signal 131 to a counter enabling signal 132 synchronized with the read clock signal 125, and for outputting an output data enabling signal 123 in accordance with the read counter value 129.

The reference numeral 108 designates a flip-flop circuit for outputting F/F output data 133 using the read data 130 as its data and the read clock signal 125 as its clock signal; and 109 designates a flip-flop circuit for producing output data 122 using the F/F output data 133 as its data and the read clock signal 125 as its clock signal.

Figure 2:
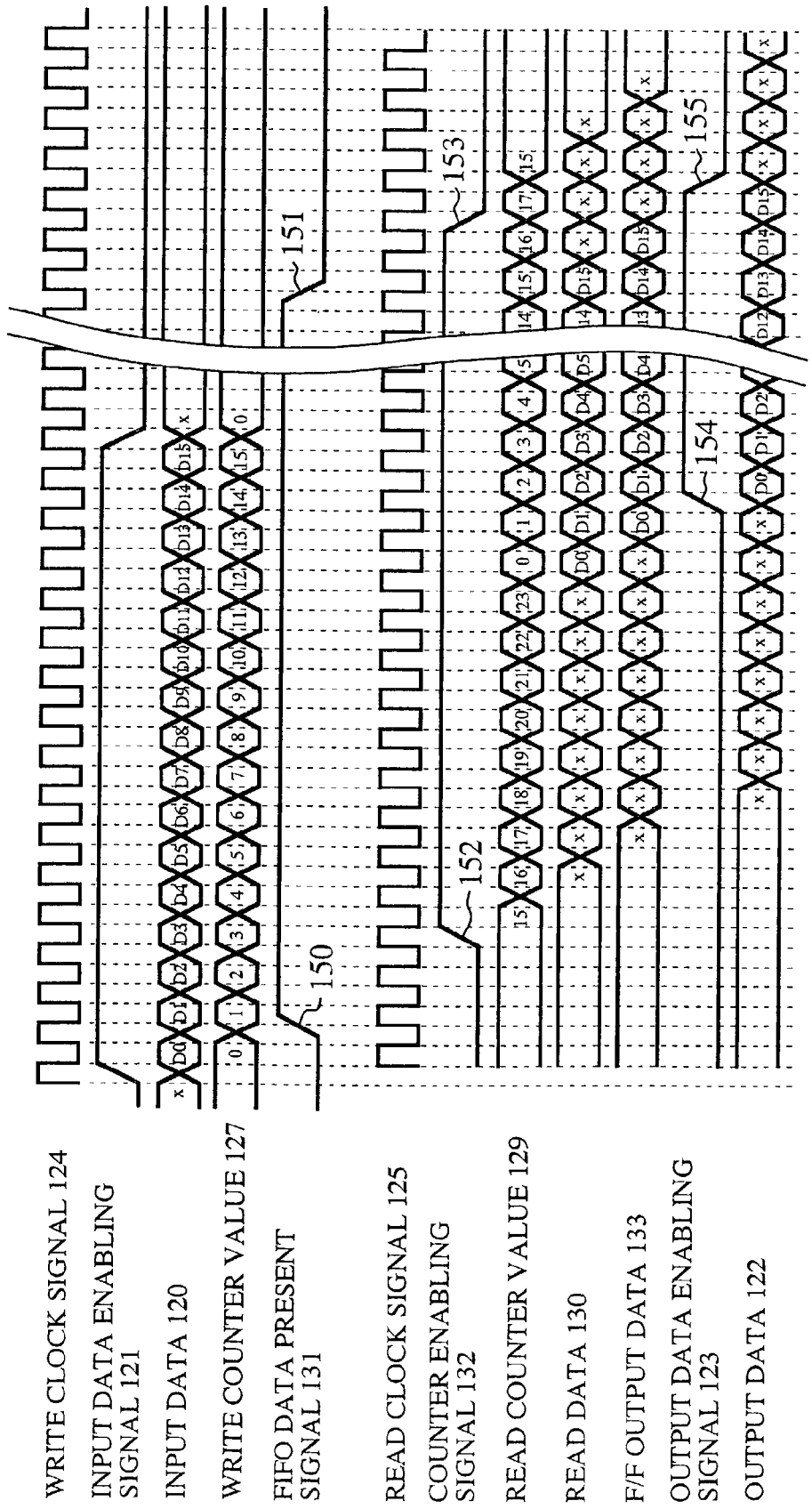
FIG. 2 is a timing chart illustrating the operation of the FIFO circuit of the embodiment 1 in accordance with the present invention.
Figure 3:
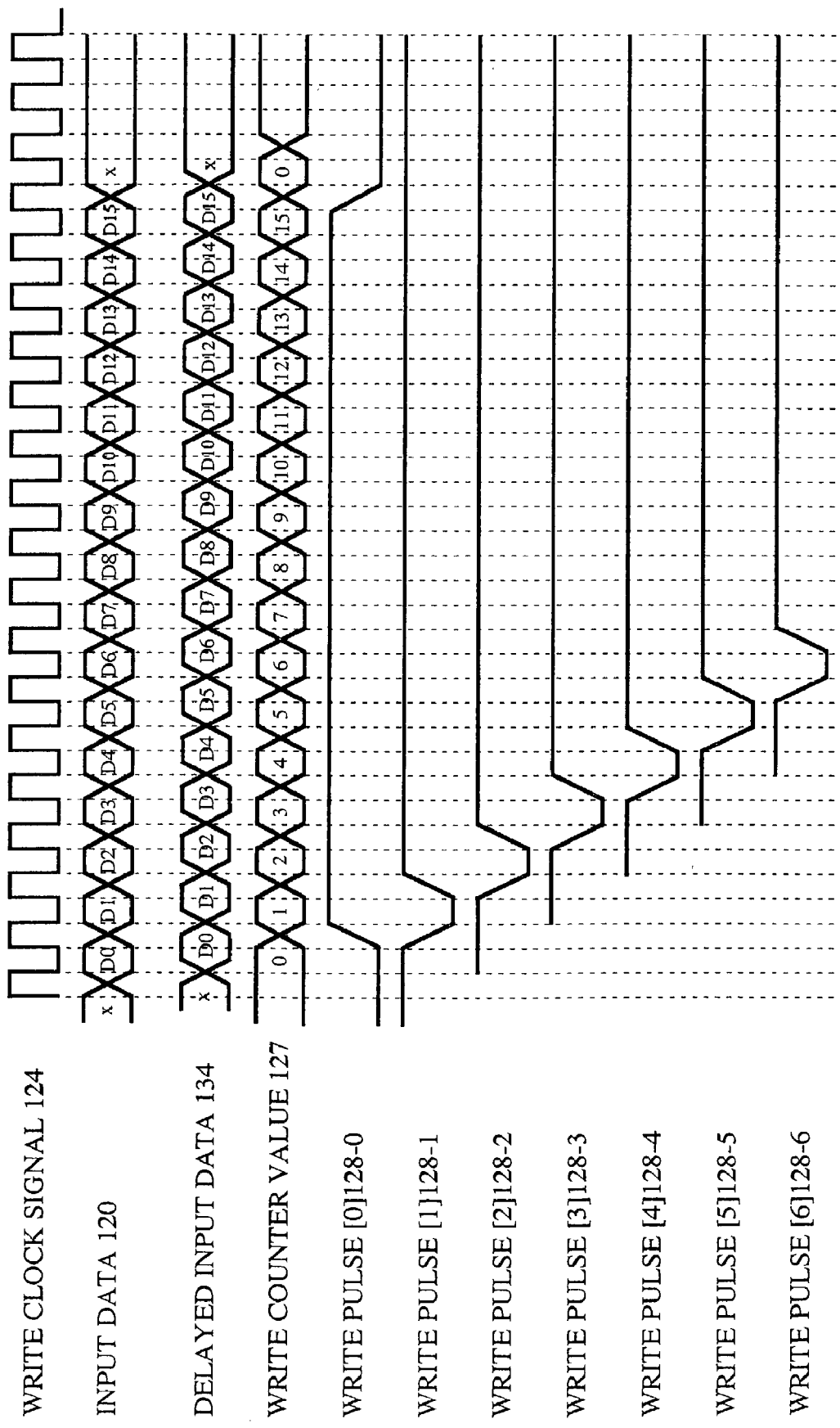
FIG. 3 is a timing chart illustrating timing of write pulses and delayed input data of the embodiment 1 in accordance with the present invention.

FIG. 2 is a timing chart illustrating the operation of the FIFO circuit of the embodiment 1 in accordance with the present invention; and FIG. 3 is a timing chart illustrating timing of write pulses and delayed input data of the embodiment 1 in accordance with the present invention.

Next, the operation of the present embodiment 1 will be described.

Here, the operation will be described by way of example of a FIFO circuit for storing 24-bit data. The application of the FIFO in accordance with the present invention, however, is not limited to the 24-bit FIFO, but to all FIFO circuits for storing any sizes of data.

In FIG. 1, the FIFO circuit is supplied with the input data 120 and input data enabling signal 121, and outputs the output data 122 and output data enabling signal 123. The input data enabling signal 121 indicates the valid period of the input data 120, and the output data enabling signal 123 indicates the valid period of the output data 122. The input data 120 and input data enabling signal 121 are synchronized with the write clock signal 124. The output data 122 and output data enabling signal 123 are synchronized with the read clock signal 125.

In FIG. 1, the FIFO circuit comprises the delay circuit 100 for delaying the input data 120; the memory circuit 101 for storing the delayed input data 134; the write counter circuit 102 for managing the write address for the memory circuit 101; the write pulse generating circuit 103 for converting the address (write counter value 127) specified by the write counter circuit 102 to the write pulses 128 for the memory circuit 101; the read counter circuit 104 for managing the read address of the memory circuit 101; the selector circuit 105 for selecting and outputting the data at the address (read counter value 129) specified by the read counter circuit 104; the empty address management circuit 106 for managing the addresses in the memory into which the data is written, and for detecting the presence of the data in the FIFO, which are not yet read out; the control circuit 107 for controlling the read counter circuit 104 in response to the FIFO data present signal 131 output from the empty address management circuit 106 and to the read counter value 129 of the read counter, and for generating the output data enabling signal 123 for notifying the outside of the validity of the output data 122 read out of the FIFO; and the flip-flop circuits 108 and 109 for establishing synchronization with the outside.

In FIG. 1, the input data 120 is delayed to produce the delayed input data 134 synchronized with the write pulses 128.

The memory output signal 126 consists of the data read from the memory circuit 101 in parallel. Since the FIFO has the memory capacity of 24 bits, the memory output signal 126 is a 24-bit signal.

The write counter value 127 is a counter value output from the write counter circuit 102.

The write pulses 128 consist of a 24-bit signal corresponding to the number of bits of the memory circuit 101, and write the delayed input data 134 to the corresponding bits of the memory circuit 101 in synchronization with the rising edges of the pulses of the individual bits. It is assumed that the write pulses 128 constituting the 24-bit signal are referred to as write pulse [0], write pulse [1], . . . , and write pulse [23]. The write pulses [n] (n=0, 1, 2, . . . , 23) write the delayed input data 134 to the nth bits of the memory circuit 101 in response to the rising edges.

The read counter value 129 is a counter value output from the read counter circuit 104.

The read data 130 is a signal consisting of one bit selected from the 24-bit memory output signal 126 in response to the read counter value 129. The selector circuit 105 functions as a 24-to-1 selector circuit.

The FIFO data present signal 131 is a signal indicating whether the data is present or not which has been written in the memory circuit 101, but has not yet been read therefrom. The empty address management circuit 106 manages the empty addresses in the memory circuit 101, and for outputting the FIFO data present signal 131.

The counter enabling signal 132 is a signal output from the control circuit 107 to instruct the read counter circuit 104 to count up. The control circuit 107 instructs the read counter circuit 104 to count up while the memory circuit 101 has the read data, to read data from the memory circuit 101.

The F/F output data 133 is the data value of the read data 130 loaded by the flip-flop circuit 108.

The output data 122 is the data value of the F/F output data 133 loaded by the flip-flop circuit 109, which is synchronized with the output data enabling signal 123.

The output data enabling signal 123 is a signal output from the control circuit 107 to indicate the valid period of the output data 122.

FIG. 2 is a timing chart illustrating the operation of the present embodiment 1. More specifically, FIG. 2 illustrates the write and read operation of the 16-bit data D0-D15 by the FIFO circuit of the embodiment 1.

In FIG. 2, the input data enabling signal 121, which is synchronized with the write clock signal 124, is "HIGH" as long as the value of the input data 120 is valid with the values D0, D1, . . . , D15. The write counter value 127 is incremented one by one from "0" as long as the value of the input data enabling signal 121 is "HIGH". If it reaches the address value "23", the final value of the 24-bit capacity of the value memory circuit 101, it returns to "0" and continues to count up from "0" sequentially. The values of the input data 120 are written into the bits of the memory circuit 101 at the addresses the write counter value 127 indicates. When the value of the input data enabling signal 121 becomes "LOW", the write counter circuit 102 stops up-counting and returns its value to "23".

The FIFO data present signal 131 is asserted and placed at "HIGH" when the data is written into the memory circuit 101 (150 in FIG. 2), and is negated when the data to be read are read out entirely from the memory circuit 101 (151 of FIG. 2).

The counter enabling signal 132 is asserted after the assertion of the FIFO data present signal 131 is detected (152 of FIG. 2). The counter enabling signal 132 is a signal synchronized with the read clock signal 125. Thus, there is a delay from the assertion of the FIFO data present signal 131 (150 of FIG. 2) to the assertion of the counter enabling signal 132 (152 of FIG. 2) for the synchronization. This also applies to the negation.

The read counter value 129 is incremented one by one from "15" while the counter enabling signal 132 is "HIGH", and returns to "0" when it reaches "23". The read counter value 129 indicates the address of the memory circuit 101 from which the data is to be read. One of the features about the read counter value 129 is that its initial value is set not at "0" but "15". While it continues counting up from the initial value "15" to "23", a wait time is secured until the data about half the memory circuit 101 of the FIFO, 12 bits, is written. Thus, even when the period of the write clock signal 124 is longer than the period of the read clock signal 125, the underrunning of the FIFO is prevented until all the data (of about 12 bits) stored in the memory circuit 101 of the FIFO have been read. In contrast, even when the period of the write clock signal 124 is shorter than the period of the read clock signal 125, the overrunning of the FIFO is prevented until all the empty addresses (about 12 bits) of the memory circuit 101 of the FIFO are occupied with the data.

The initial value is set at "15" instead of "12", half the 24 bits, to cancel out the period from the time when the data is written into the FIFO to the time when the counter enabling signal 132 is asserted. Accordingly, the initial value of the read counter circuit 104 can become any value from "0" to "23" instead of "15" depending on the delay amount.

As the read data 130, the memory output at the address specified by the read counter value 129 is selected and output. The read data 130 which is read before the read counter value 129 reaches "23" for the first time is invalid. The values read from the time when the FIFO data present signal 131 is negated (151 of FIG. 2) to the time when the counter enabling signal 132 is negated (153 of FIG. 2) are also invalid.

The F/F output data 133 is delayed from the read data 130 by one period of the read clock signal. Likewise, the output data 122 is delayed from the F/F output data 133 by one period of the read clock signal.

The output data enabling signal 123, which indicates the valid section of the output data 122, is asserted when the read counter value 129 reaches "2" for the first time after the counter enabling signal 132 is asserted (154 of FIG. 2), and is negated when the counter enabling signal 132 is negated (155 of FIG. 2).

FIG. 3 is a timing chart illustrating the timing of the write pulses 128 and delayed input data 134 in the present embodiment 1.

FIG. 3 illustrates waveforms of the write clock signal 124, input data 120, delayed input data 134, write counter value 127, write pulse [0] 128-0, write pulse [1] 128-1, . . . , and write pulse [5] 128-5.

The write pulses 128 are a one hot code obtained by decoding the write counter value 127: when the write counter value 127 is "0", the value of the write pulse [0] 128-0 becomes "LOW"; and when the write counter value 127 is "1", "2", "3", "4" and "5", the values of the write pulse [1] 128-1, . . . , and write pulse [5] 128-5 become "LOW", respectively. In synchronization with the rising edges of the write pulses, the values of the delayed input data 134 are written into the memory circuit 101.

Although FIG. 3 illustrates only the write pulses [0]-[5], the remaining write pulses [6]-[23] also consist of one hot code obtained by decoding the write counter value 127.

Although FIG. 3 illustrates the timing chart of loading the delayed input data 134 at the rising edges of the write pulses 128, the falling edges are also usable.

As described above, the present embodiment 1 offers the following advantages.

1. Since the data are written into the memory circuit 101 by the write pulses 128, it becomes unnecessary to supply the write clock signal 124 to the memory circuit 101. Therefore, the current consumption is reduced.
2. The conventional FIFO circuit must deliver the input data 120 to all the 24-bit addresses of the memory circuit 101. Accordingly, it is unavoidable in the conventional FIFO circuit that a delay occurs for the input data 120 to reach the memory circuit 101, which prevents the speedup of the conventional FIFO circuit. In contrast, since the present embodiment 1 writes the input data using the write pulses 128, it can cancel out the delay from the input data 120 to the memory circuit 101 by matching the delay between the write pulses 128 and the delayed input data 134. As a result, the present embodiment 1 can achieve the speedup with ease.
3. Since the present embodiment 1 manages the address of the memory circuit 101 by the write counter circuit 102 and read counter circuit 104, it can simplify the circuit configuration.
4. Varying the initial value of the read counter circuit 104 makes it possible to wait for the data to be accumulated in the FIFO. Thus, the present embodiment 1 offers an advantage of being able to wait for the data to be accumulated in the FIFO without installing any additional counter circuit. In other words, it can reduce the circuit scale and current consumption.

Embodiment 2

Figure 4:
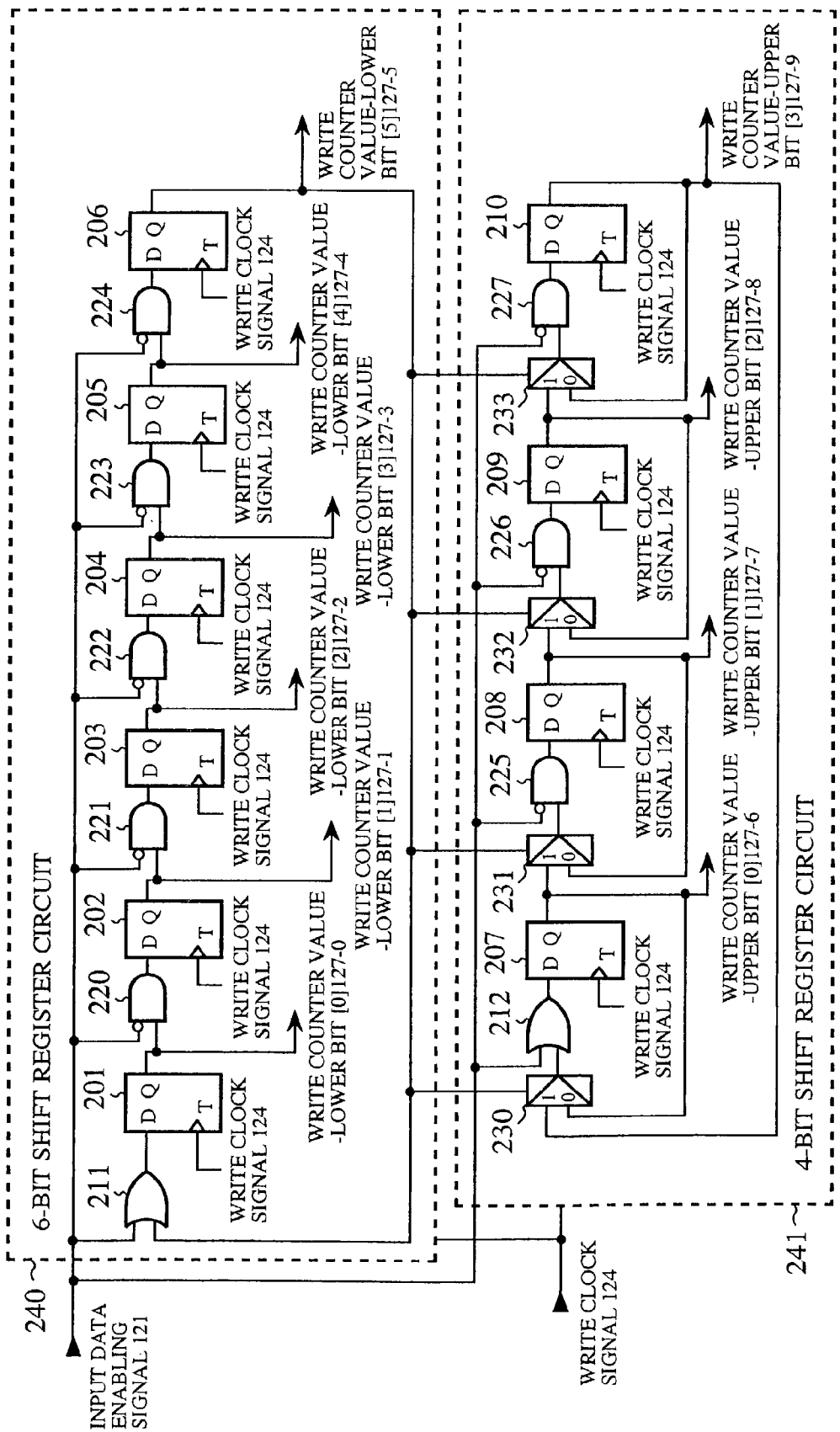
FIG. 4 is a block diagram showing a detailed configuration of the write counter circuit of an embodiment 2 in accordance with the present invention.

FIG. 4 is a block diagram showing a detailed configuration of the write counter circuit of an embodiment 2 in accordance with the present invention. In FIG. 4, reference numerals 201-210 each designate a flip-flop circuit, 211 and 212 each designate an OR circuit, 220-227 each designate an AND circuit and 230-233 each designate a 2-to-1 selector circuit. The reference numeral 240 designates a 6-bit shift register circuit, and 241 designates a 4-bit shift register circuit.

Figure 5:
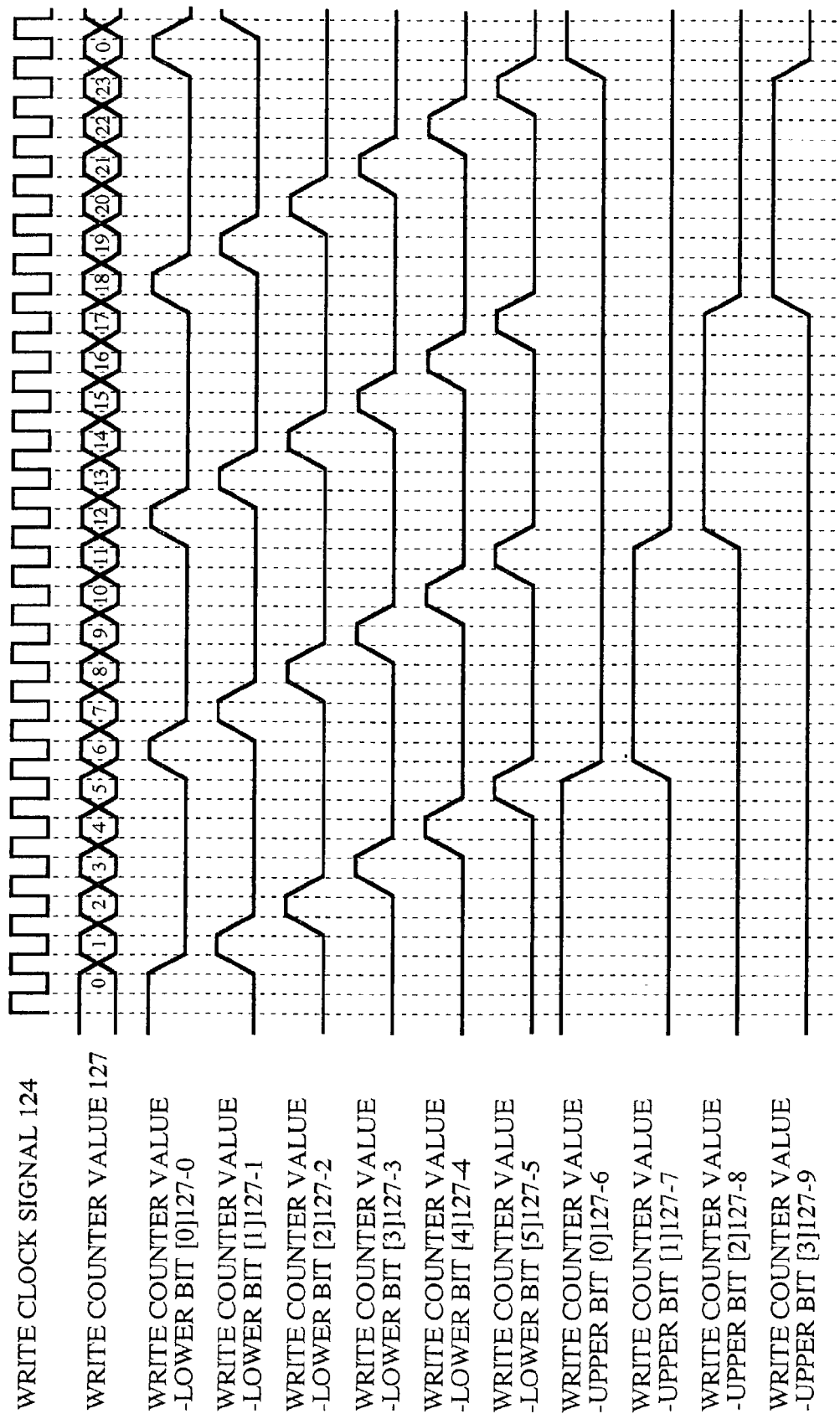
FIG. 5 is a timing chart illustrating the operation of the write counter circuit of the embodiment 2 in accordance with the present invention.

FIG. 5 is a timing chart illustrating the operation of the write counter circuit of the embodiment 2 in accordance with the present invention.

Next, the operation of the present embodiment 2 will be described.

FIG. 4 is a block diagram showing the write counter circuit 102 of the present embodiment 2.

The write counter circuit 102, which counts up from "0" to "23" one by one, comprises 10 flip-flop circuits 201-210, two OR circuits 211 and 212, eight AND circuits 220-227 and four 2-to-1 selector circuits 230-233.

In FIG. 4, the six flip-flop circuit 201-206, one OR circuit 211 and five AND circuits 220-224 are combined to constitute the 6-bit shift register circuit 240.

Likewise, the four flip-flop circuits 207-210, one OR circuit 212, three AND circuits 225-227 and four 2-to-1 selector circuits 230-233 are combined to constitute the 4-bit shift register circuit 241.

Assume that the output signals of the 6-bit shift register circuit 240 consist of the write counter value-lower bit [0] 127-0, . . . , and the write counter value-lower bit [5] 127-5; and that the output signals of the 4-bit shift register circuit

241 consist of the write counter value-upper bit [0] 127-6, . . . , and the write counter value-upper bit [3] 127-9.

The write counter values N (N=0, 1, 2, . . . , and 23) are represented by the combinations of the write counter value-lower bits [L] (L=0, 1, 2, 3, 4 and 5) and the write counter value-upper bits [H] (H=0, 1, 2 and 3). The relationship of the values N, H and L are given by the following expression (1).

$$N = H \times 6 + L \quad (1)$$

For example, when the write counter value-lower bit [1] and the write counter value-upper bit [2] are "HIGH", the write counter value 127 is given by the following expression (2).

$$2 \times 6 + 1 = 13 \quad (2)$$

FIG. 5 is a timing chart illustrating the operation of the write counter circuit 102.

As for the 6-bit shift register circuit 240, while the input data enabling signal 121 is "LOW", only the write counter value-lower bit [0] 127-0 is placed at "HIGH" with placing the remaining bits at "LOW". In contrast, while the input data enabling signal 121 is "HIGH", every time the rising edge of the write clock signal 124 is supplied, the flip-flop holding the value "HIGH" shifts rightward by one step. Thus, a shift register circuit is configured whose value is incremented and shifted one by one.

As for the 4-bit shift register circuit 241, while the input data enabling signal 121 is "LOW", only the write counter value-upper bit [0] 127-6 is placed at "HIGH" with placing the remaining bits at "LOW". In contrast, while the input data enabling signal 121 is "HIGH" and when the write counter value-lower bit [5] 127-5 is "HIGH", every time the rising edge of the write clock signal 124 is supplied, the flip-flop holding the value "HIGH" shifts rightward by one step. Thus, a shift register circuit is constructed whose value is incremented and shifted one by one at every 6-clock pulse interval.

The combinations of the write counter value-lower bits [L] (L=0, 1, 2, 3, 4 and 5) and the write counter value-upper bits [H] (H=0, 1, 2 and 3) represents the steps from "0" to "23". For example, when both the write counter value-lower bit [0] 127-0 and write counter value-upper bit [0] 127-6 are "HIGH", the write counter value 127 assumes "0". Other examples are shown in FIG. 5.

As described above, the present embodiment 2 offers the following advantages.

1. The combinations of the counter circuits, which have a small number of bits and a hierarchical relationship of upper and lower ranks, can implement the counter circuit with a large number of bits. Accordingly, the present embodiment 2 can implement the counter circuit with a small circuit scale and small current consumption. In addition, the small circuit scale contributes to the speedup.
2. The write pulse generating circuit 103 can be implemented. easily by NAND circuits of the upper bit and lower bit as will be described in the following embodiment 3. As a result, the circuit scale can be further reduced.

Embodiment 3

Figure 6:
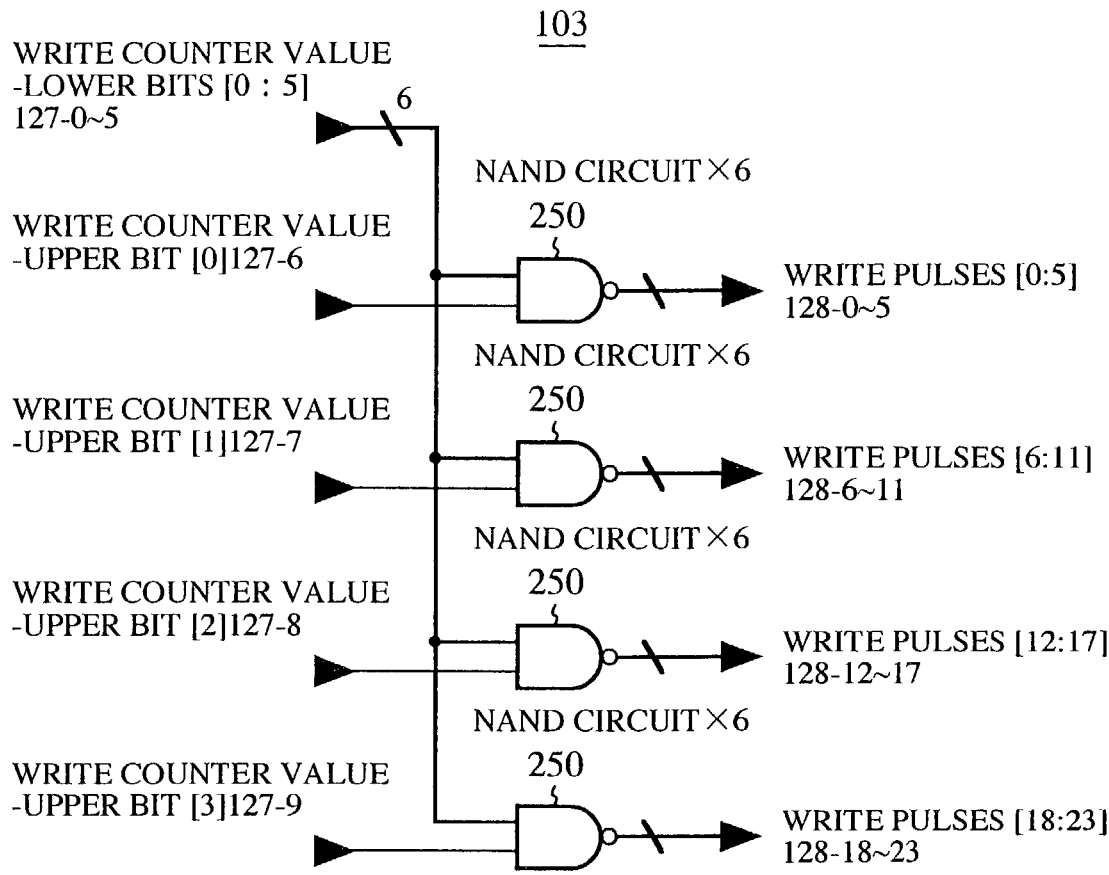
FIG. 6 is a block diagram showing a detailed configuration of the write pulse generating circuit of an embodiment 3 in accordance with the present invention.

FIG. 6 is a block diagram showing a detailed configuration of the write pulse generating circuit of an embodiment 3 in accordance with the present invention, in which the reference numeral 250 designates a NAND circuit.

Next, the operation of the present embodiment 3 will be described.

FIG. 6 is a block diagram showing the write pulse generating circuit 103 of the present embodiment 3.

In FIG. 6, the write pulse generating circuit 103 comprises 24 NAND circuits 250 for calculating the NAND values of all the combinations between the write counter value-lower bits [L] (L =0, 1, 2, 3, 4 and 5) and the write counter value-upper bits [H] (H=0, 1, 2 and 3) of the write counter circuit 102 as shown in FIG. 4.

The outputs of the 24 NAND circuits 250 become the write pulses 128 each of which consists of a 24-bit one hot code.

As described above, the present embodiment 3 offers the following advantage.

1. The present embodiment 3 generates the write pulses 128 using a simple circuit composed of NAND circuits 250 each of which handles only two signals. Thus, it can adjust the timing in such a manner that no spikes occur in the write pulses, which is difficult for the conventional circuit to prevent because it uses a complicated combination circuit.

Embodiment 4

Figure 7:
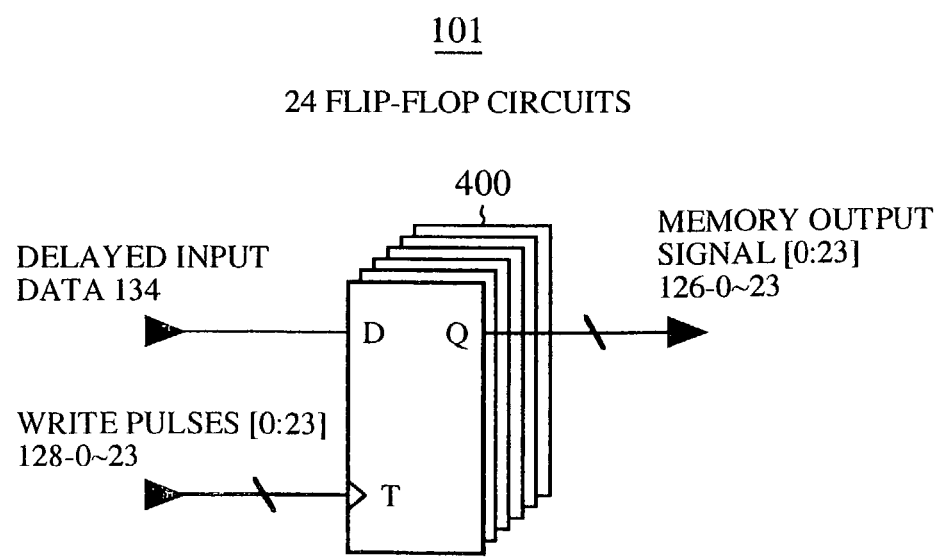
FIG. 7 is a block diagram showing a detailed configuration of a memory circuit of an embodiment 4 in accordance with the present invention.

FIG. 7 is a block diagram showing a detailed configuration of a memory circuit of an embodiment 4 in accordance with the present invention, in which the reference numeral 400 designates a flip-flop circuit.

Next, the operation of the present embodiment 4 will be described.

FIG. 7 is a block diagram showing a memory circuit 101 of the present embodiment 4.

In FIG. 7, the memory circuit 101 comprises 24 flip-flop circuits 400.

The individual flip-flop circuits 400 load the values of the delayed input data 134 in synchronization with the rising edges of the write pulses 128. The outputs of the flip-flop circuits 400 captured by the write pulses 128-M (M=0, 1, 2, 3, . . . , 23) become the memory outputs [M] 126-M.

Embodiment 5

Figure 8:
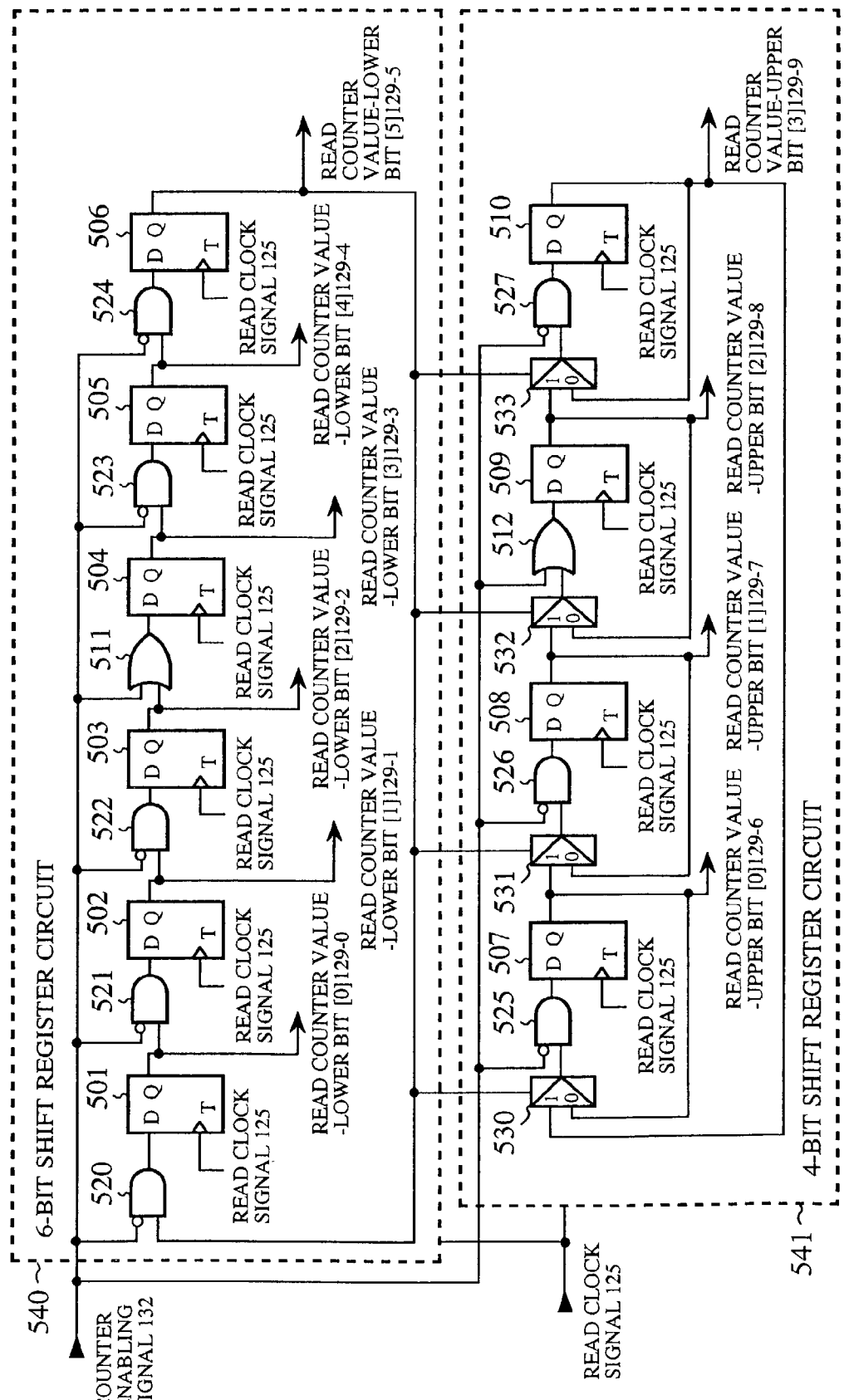
FIG. 8 is a block diagram showing a detailed configuration of the read counter circuit of an embodiment 5 in accordance with the present invention.

FIG. 8 is a block diagram showing a detailed configuration of the read counter circuit of an embodiment 5 in accordance with the present invention. In FIG. 5, reference numerals 501-510 each designate a flip-flop circuit, 511 and 512 each designate an OR circuit, 520-527 each designate an AND circuit and 530-533 each designate a 2-to-1 selector circuit. The reference numeral 540 designates a 6-bit shift register circuit and 541 designates a 4-bit shift register circuit.

Next, the operation of the present embodiment 5 will be described.

FIG. 8 is a block diagram showing the read counter circuit 104 of the present embodiment 5.

The read counter circuit 104 of FIG. 8 has almost the same configuration as the write counter circuit 102 described in the foregoing embodiment 2: They differ only in the initial values.

In FIG. 8, the read counter circuit 104 comprises 10 flip-flop circuits 501-510, two OR circuits 511 and 512, eight AND circuits 520-527 and four 2-to-1 selector circuits 530-533.

The six flip-flop circuits 501-506, one OR circuit 511 and five AND circuits 520-524 are combined to constitute the 6-bit shift register circuit 540.

Likewise, the four flip-flop circuits 507-510, one OR circuit 512, three AND circuits 525-527 and four 2-to-1 selector circuits 530-533 are combined to constitute the 4-bit shift register circuit 541.

Assume that the output signals of the 6-bit shift register circuit 540 consist of a read counter value-lower bit [0] 129-0, . . . , and a read counter value-lower bit [5] 129-5, and that the output signals of the 4-bit shift register circuit 541 consist of a read counter value-upper bit [0] 129-6, . . . , and a read counter value-upper bit [3] 129-9.

The read counter circuit 104 differs from the write counter circuit 102 in the insertion positions of the OR circuits. Thus, while the counter enabling signal 132 is "LOW", the read counter value-lower bit [3] 129-3 and read counter value-upper bit [2] 129-8 are placed at "HIGH" so that the initial value is given by the following expression.

$$2 \times 6 + 3 = 15 \qquad (3)$$

As described above, the present embodiment 5 offers the following advantage.

1. The present embodiment 5 implements a multi-bit counter circuit by combining a plurality of counter circuits which have a small number of bits and hierarchical relationship of upper and lower ranks. Thus, the present embodiment 5 can implement a counter circuit with a small circuit scale and small current consumption. The small circuit scale also contributes to the speedup of the circuit.

Embodiment 6

Figure 9:
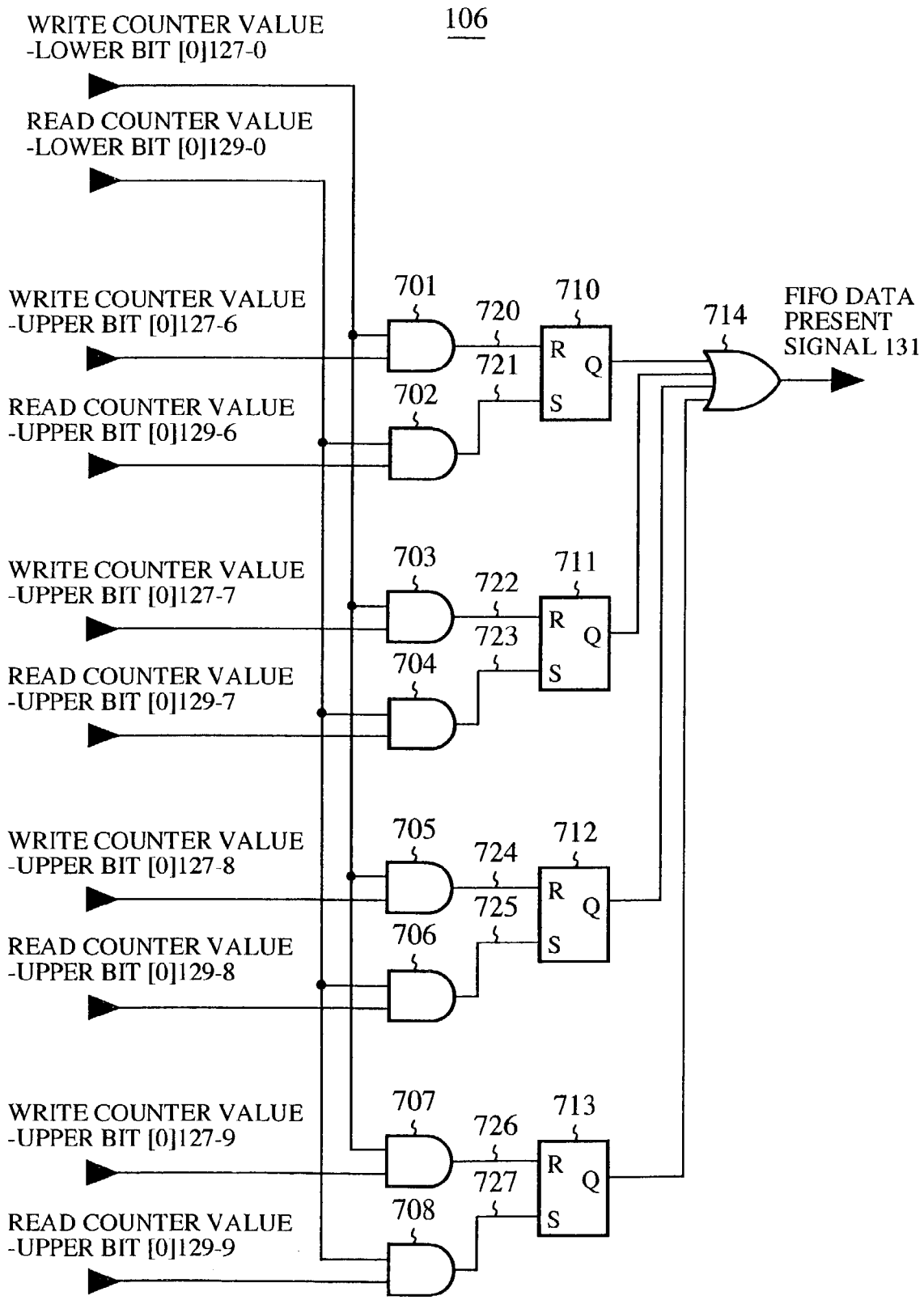
FIG. 9 is a block diagram showing a detailed configuration of the empty address management circuit of an embodiment 6 in accordance with the present invention.

FIG. 9 is a block diagram showing a detailed configuration of the empty address management circuit of an embodiment 6 in accordance with the present invention. In this figure, reference numerals 701-708 each designate an AND circuit, 710-713 each designate a flip-flop circuit and the reference numeral 714 designates an OR circuit.

Next, the operation of the present embodiment 6 will be described.

FIG. 9 is a block diagram showing the empty address management circuit 106 of the present embodiment 6.

In FIG. 9, the empty address management circuit 106 comprises eight AND circuits 701-708, four flip-flop circuits 710-713 and one 4-input OR circuit 714.

The eight AND circuit 701-708 decode the write counter value 127 and read counter value 129, the output signals 720-727 of which are as follows. The signal 720 indicates the write counter value "0", the signal 721 indicates the read counter value "0", the signal 722 indicates the write counter value "6", the signal 723 indicates the read counter value "6", the signal 724 indicates the write counter value "12", the signal 725 indicates the read counter value "12", the signal 726 indicates the write counter value "18" and the signal 727 indicates the read counter value "18".

The flip-flop circuit 710 indicates that the memory circuit 101 stores data at address "0", which has been written but not yet read out. The flip-flop circuit 710 is set at "HIGH" when the signal 720 is asserted, that is, when the date is written into the address "0", and is negated to "LOW" when the signal 721 is asserted, that is, when the data is read from the address "0".

Likewise, the flip-flop circuits 711-713 indicate that the addresses "6", "12" and "18" each have data which has been written, but not yet read out.

The output signal of the OR circuit 714, the FIFO data present signal, becomes "HIGH" when any one of the flip-flop circuits 710-713 is "HIGH", that is, when at least one of the addresses "0", "6", "12" and "18" stores the data which has been written, but not yet read out.

Thus, the present embodiment 6 manages the data of the entire FIFO by detecting the presence or absence of the data not for all the addresses, but by using the empty signals at every 6-bit interval, thereby being able to reduce the number of flip-flop circuits.

As a side effect of managing the addresses by a smaller number of the flip-flop circuits, the data absent state of the FIFO cannot be always recognized correctly. For example, even if the data is present at the address "1", since the addresses "0", "6", "12" and "18" of the memory circuit 101 are empty, the FIFO data present signal 131 is placed at "LOW". To prevent the presence of the unread data in the FIFO when using the empty address management circuit 106, the sampling points of the FIFO data present signal 131 by the control circuit 107 are limited to only the read clock signals at the addresses "0", "6", "12" and "18", not allowing the sampling at all the clock signals.

As described above, the present embodiment 6 offers the following advantages.

1. The empty address management can be achieved by a smaller number of flip-flop circuits. Accordingly, the present embodiment 6 can reduce the current consumption and area.
2. Since the flip-flop circuits constituting the empty address management circuit are not supplied with the clock signal, the current consumption can be reduced.

Embodiment 7

Figure 10:
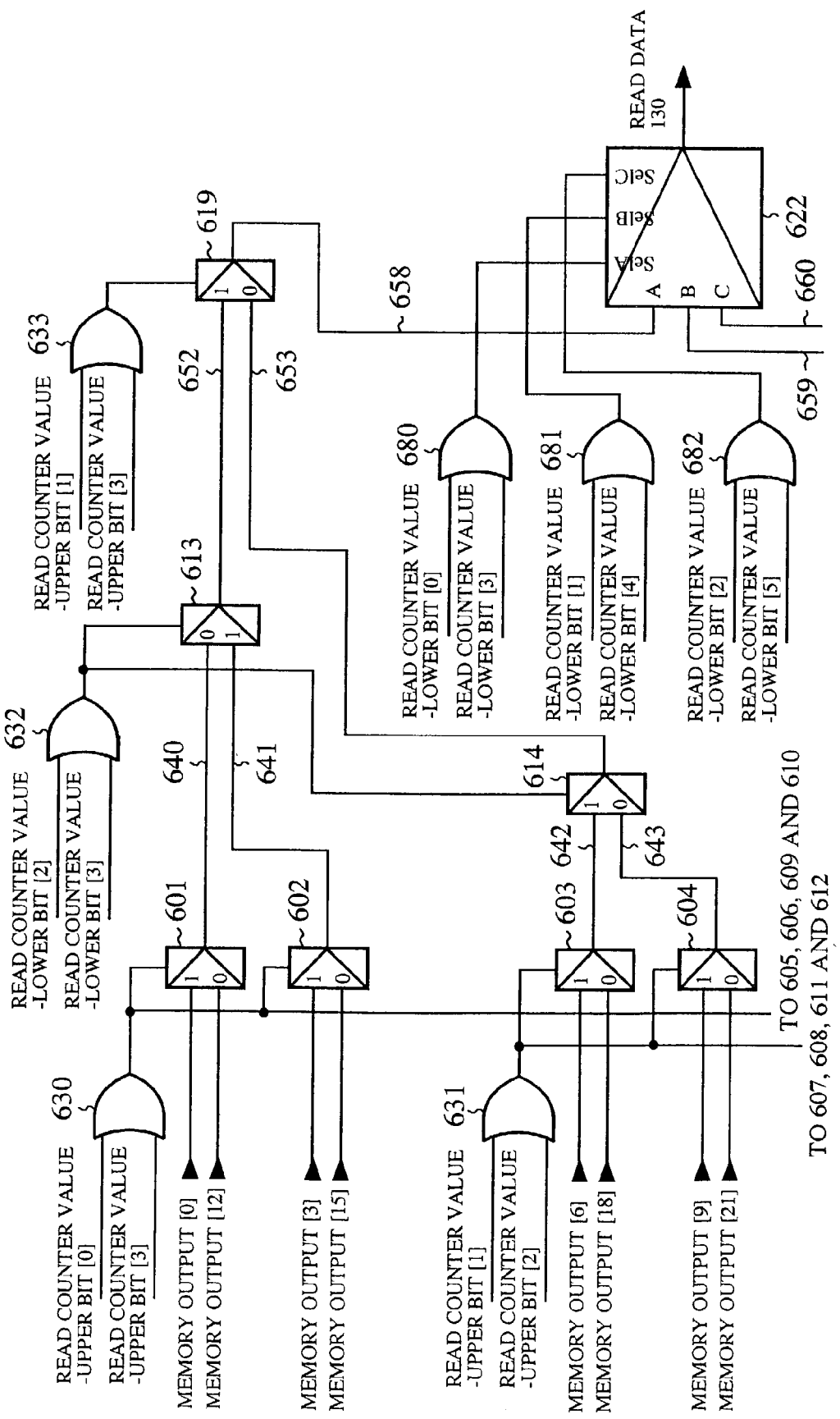
FIGS. 10 and 11 are block diagrams showing a detailed configuration of the selector circuit of an embodiment 7 in accordance with the present invention.
Figure 11:
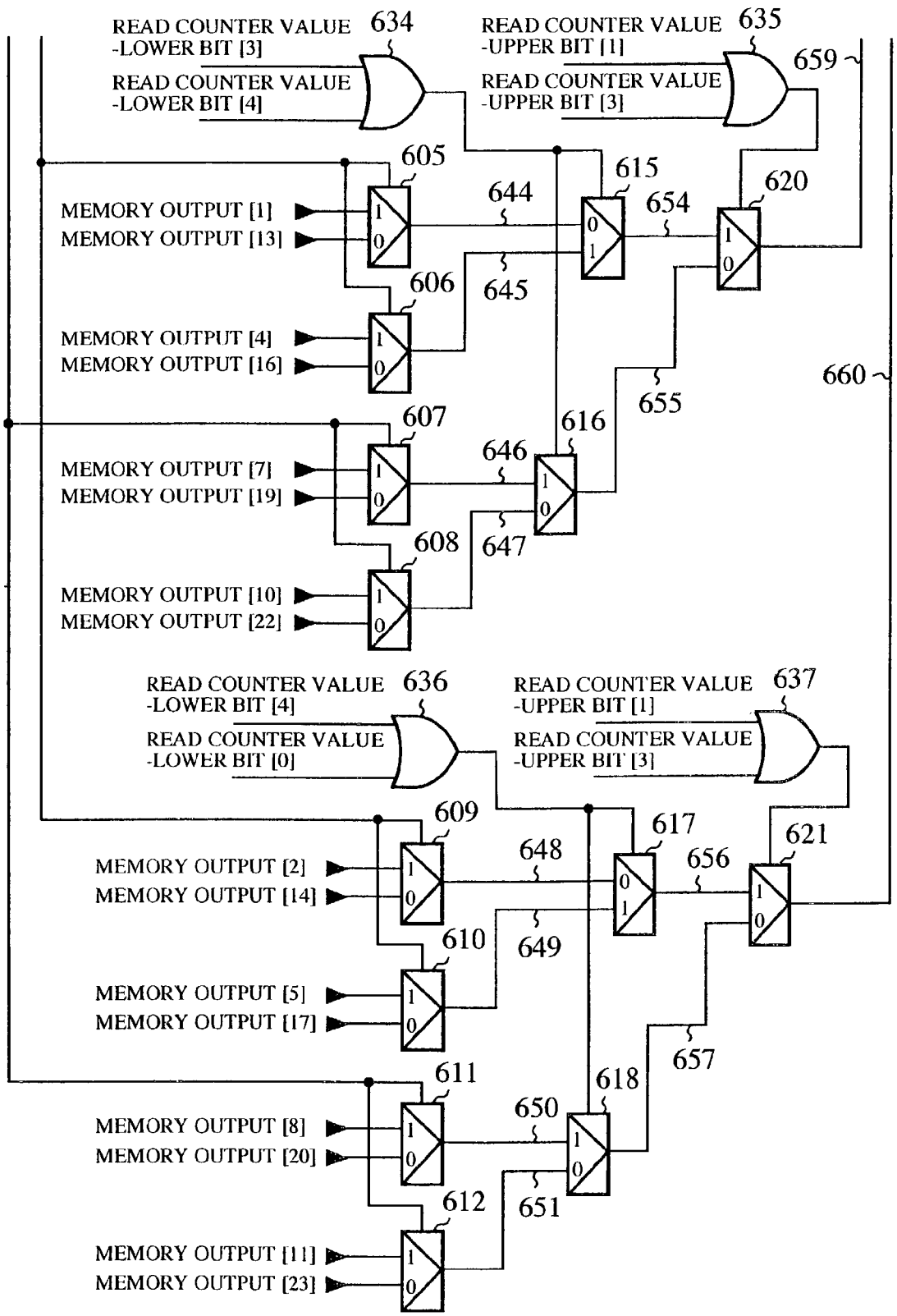

FIGS. 10 and 11 are block diagrams showing a detailed configuration of a selector circuit of an embodiment 7 in accordance with the present invention. In these figures, reference numerals 601-621 each designate a 2-to-1 selector circuit, the reference numeral 622 designate a 3-to-1 selector circuit, and reference numerals 630-637 and 680-682 each designate an OR circuit.

FIG. 12 is a timing chart illustrating the operation of the selector circuit of the embodiment 7 in accordance with the present invention.

Next, the operation of the present embodiment 7 will be described.

FIGS. 10 and 11 are block diagrams showing the multiple-bit selector circuit 105 of the present embodiment 7.

Generally, the 24-bit multiple-bit selector circuit is implemented by combining selector circuits with a small number of bits, such as 2-to-1 selector circuits and 3-to-1 selector circuits. Implementing the multiple-bit selector circuit by simply combining the selector circuits will increase the number of stages of the selector circuits, thereby making it difficult to enhance its speed. For example, to configure the 24-to-1 selector circuit using only the 2-to-1 selector circuits and the 3-to-1 selector circuit, four selector circuits must be passed through to select one of the 24 bits of the memory output signal 126. First, 12 bits are selected from the 24-bit signal using 12 2-to-1 selector circuits. Second, six bits are selected by six 2-to-1 selector circuits at the second stage. Third, three bits are selected by three 2-to-1 selector circuits at the third stage. Finally, one bit is selected by a single 3-to-1 selector circuit at the fourth stage. The present embodiment 7 is implemented to reduce the delay involved in such a circuit, thereby speeding up the circuit.

In FIGS. 10 and 11, the 24-to-1 selector circuit comprises 21 2-to-1 selector circuits 601-621, one 3-to-1 selector circuit 622, and 11 OR circuits 630-637 and 680-682. Signals 640-660 are selection result signals of the respective selector circuits.

FIG. 12 is a timing chart illustrating the operation of the 24-to-1 selector circuit.

In FIG. 12, the signals 640, 641, 652, 642, 643, 653 and 658 show the outputs of the corresponding intermediate nodes of the selector circuit 105.

The signal 640 selects and outputs the memory output [0] while the read counter value is "0"-"5" and "18"-"23". In FIG. 12, the memory output [0] is denoted by D0. During the remaining periods, the signal 640 selects and outputs the memory output [12] (D12 of FIG. 12).

Likewise, the signal 641 selects and outputs the memory output [3] while the read counter value is "0"-"5" and "18"-"23" (D3 of FIG. 12). During the remaining periods, the signal 641 selects and outputs the memory output [15] (D15 of FIG. 12).

The selection signals of the selector circuits 601 and 602 for generating the signals 640 and 641 can be generated easily by the OR circuit 630 for the upper bits [0] and [3] of the read counter value.

The signal 652 selects the signal 641 when the read counter value is "2", "3", "8", "9", "14", "15", "20" or "21". During the remaining periods, the signal 652 selects the signal 640. As the result of the selection, the bit values of the memory that are output as the signal 652 are shown in FIG. 12. When the memory outputs in the signal 652 are used by the post stage selector circuits (hatched portions of the signal 652 of FIG. 12) such as the values of the memory output [0] (D0 of FIG. 12), memory output [3] (D3 of FIG. 12), memory output [12] (D12 of FIG. 12) and memory output [15] (D15 of FIG. 12), they are always determined at the timing of the previous clock signals. Thus, the anticipatory selection is implemented. In addition, the selection signal of the selector circuit 613 for generating the signal 652 can be generated easily by the OR circuit 632 for the lower bits [2] and [3] of the read counter value.

Likewise, the selection results of the signals 642, 643 and 653 are shown in FIG. 12. When the selection results of the signal 653 (hatched portions of the signal 653 of FIG. 12) are used by the post stage selector circuits, their values are always determined at previous clock pulses.

The signal 658 of FIG. 12 consists of the selection results of the signals 652 and 653, whose selection can be achieved by the OR circuit 633 for the upper bits [1] and [3] of the read counter value.

The read data 130 of FIG. 12 is the output signal selected by the 3-to-1 selector circuit from the signal 658 and the signals 659 and 660 which are generated in the same manner as the signal 658.

As described above, among the selector circuits, the first two stage selector circuits 601-618 operate as an anticipatory selection circuit. More specifically, the selector circuits 601, 602 and 613 are controlled such that the output signal 652 of the selector circuit 613 is always determined previously by at least one read clock signal. Likewise, the signals 653-657 that pass through two stages of the selector circuits are always determined by at least one read clock signal previously. The remaining selector circuits 619-622 operate together as an ordinary 6-to-1 selector circuit. Since the outputs of the selector circuits at the first two stages are determined previously by at least one read clock signal, the 24-to-1 selector circuit with only the delay of the post stage 6-to-1 selector circuit, which is limited within one read clock pulse, can be implemented. Thus, the 24-to-1 selector circuit can be implemented at nearly the same delay as the 6-to-1 selector circuit.

It will be anticipated that generating the selection signals of the anticipatory selection circuits becomes complicated in general. This is because the selection conditions will become complicated to determine the value of an intermediate node from the one previous clock signal. The present embodiment 7, however, utilizing the fact that the read counter circuit 104 is made hierarchical so that the read counter value is supplied separately as the upper bits and lower bits, can generate the selection signals easily by controlling such that the upper bits and lower bits each select their values previously As described above, the present embodiment 7 offers the following advantages.

1. The present embodiment 7 comprises the anticipatory selection circuit, thereby being able to implement the high-speed, multi-bit selector circuit.
2. Combining the hierarchical counter circuits makes it possible to simplify the decoder circuit for generating the selection signal of the anticipatory selection circuit.

What is claimed is:

1. A FIFO circuit comprising:
a write counter circuit for counting a write clock signal during a valid period of input data, and for outputting a write counter value;
a memory circuit for storing the input data in response to the write counter value output from said write counter circuit;
an empty address management circuit for deciding whether said memory circuit includes data which has not yet been read out of said memory circuit, in response to the write counter value output from said write counter circuit and in response to a read counter value;
a read counter circuit for counting a read clock signal and for outputting the read counter value when said empty address management circuit makes a decision that said memory circuit includes the data which has not yet been read;
a selector circuit for selecting and reading data from said memory circuit in response to the read counter value output from said read counter circuit;
a write pulse generating circuit for converting the write counter value output from said write counter circuit into write pulses, wherein said memory circuit stores the input data in response to the write pulses output from said write pulse generating circuit; and
a delay circuit for delaying the input data to synchronize the input data with the write pulses, and for supplying the delayed input data to said memory circuit.

2. The FIFO circuit according to claim 1, wherein said empty address management circuit manages a part of all the empty addresses comprising a plurality of discrete or continuous bits of the write counter value and read counter value.

3. The FIFO circuit according to claim 1, wherein write pulses correspond to a number of bits of an address of the memory circuit.

4. A FIFO circuit comprising:
a write counter circuit for counting a write clock signal during a valid period of input data, and for outputting a write counter value;
a memory circuit for storing the input data in response to the write counter value output from said write counter circuit;

an empty address management circuit for deciding whether said memory circuit includes data which has not yet been read out of said memory circuit, in response to the write counter value output from said write counter circuit and in response to a read counter value;

a read counter circuit for counting a read clock signal and for outputting the read counter value when said empty address management circuit makes a decision that said memory circuit includes the data which has not yet been read;

a selector circuit for selecting and reading data from said memory circuit in response to the read counter value output from said read counter circuit, wherein said selector circuit is composed of a plurality of stages of selector circuits with a hierarchical configuration including pre-stage selector circuits that constitute an anticipatory selection circuit that enables outputs of said pre-stage selector circuits to be determined at least up to a timing of an immediately previous read clock pulse; and a write pulse generating circuit for converting the write counter value output from said write counter circuit into write pulses, wherein said memory circuit stores the input data in response to the write pulses output from said write pulse generating circuit.

5. The FIFO circuit according to claim 4, wherein said read counter circuit comprises a plurality of stages of counter circuits with a hierarchical structure, and wherein said FIFO circuit further comprises OR circuits for outputting logical ORs of outputs of said plurality of stages of counter circuits to generate selection signals of said plurality of stages of selector circuits.

* * * * *